United States Patent
Li

(10) Patent No.: US 10,863,200 B2
(45) Date of Patent: Dec. 8, 2020

(54) TECHNIQUES FOR PERFORMING A FORWARD TRANSFORMATION BY A VIDEO ENCODER USING A FORWARD TRANSFORM MATRIX

(71) Applicant: INTEL CORPORATION, Santa Clara, CA (US)

(72) Inventor: Douglas L. Li, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 866 days.

(21) Appl. No.: 14/341,481

(22) Filed: Jul. 25, 2014

(65) Prior Publication Data
US 2016/0029046 A1    Jan. 28, 2016

(51) Int. Cl.
H04N 19/00     (2014.01)
*H04N 19/625*    (2014.01)
*H04N 19/42*    (2014.01)

(52) U.S. Cl.
CPC .......... *H04N 19/625* (2014.11); *H04N 19/42* (2014.11)

(58) Field of Classification Search
CPC ....... H04N 7/26–50; H04N 7/00; H04N 19/00
See application file for complete search history.

(56) References Cited

U.S. PATENT DOCUMENTS 9,544,596 B1 *    1/2017    Han .................... H04N 19/105
2009/0172506 A1 *    7/2009    Yoneoka ................ H04N 19/61
                                                                714/799
2012/0014455 A1    1/2012    Joshi et al.
2012/0082212 A1 *    4/2012    Sadafale ............... G06F 17/147
                                                                375/240.2
2012/0177108 A1    7/2012    Joshi et al.
2013/0161676 A1    6/2013    Fong et al.

FOREIGN PATENT DOCUMENTS

CN        103501437 A        1/2014

OTHER PUBLICATIONS

Grange, "A VP9 Bitstream Overview", Network Working Group, Feb. 18, 2013, 14 pages.*
International Search Report and Written Opinion received for PCT Patent Application No. PCT/US2015/037388, dated Oct. 12, 2015, 12 pages.
Grange et al., "A VP9 Bitstream Overview", Network Working Group, Internet Draft, Feb. 18, 2013, 14 pages.
Han et al., "Jointly Optimized Spatial Prediction and Block Transform for Video and Image Coding," IEEE Transactions on Image Processing, vol. 21, No. 4, Apr. 2012, pp. 1874-1884.
Extended European Search Report received for European Patent Application No. 15824992.0, dated Dec. 20, 2017, 2 pages.

* cited by examiner

*Primary Examiner* — Maryam A Nasri

(57) ABSTRACT

Various embodiments are generally directed to an apparatus, method and other techniques for storing, in memory, at least one master forward transform matrix comprising signed constants having a defined number of precision bits and a sign bit and determining, by processing circuitry, which forward transform matrix to use to perform a transformation based on at least a transform unit size. Further, various techniques may include performing, by the processing circuitry, the transformation on residuals of pixel values of a frame using one of the at least one master forward transform matrix or a forward transform matrix derived from one of the master forward transform matrix at least partially based on the determination.

25 Claims, 25 Drawing Sheets

*FIG. 2 (Con't)*

200

{ 7723,-16305, 10394, 4756,-15679, 12665, 1606,-14449, 14449, -1606,-12665, 15679, -4756,-10394, 16305,-10394, -4756, 15679,-12665, -1606, 14449,-14449, 1606, 12665,-15679, 4756, 10394,-16305, 7723},

{ 7005,-15893, 13160, -804,-12140, 16207, -8423, -5520, 15426,-14053, 2404, 11003,-16364, 9760, 3981,-14811, 14811, -3981, -9760, 16364, -11003, -2404, 14053,-15426, 5520, 8423,-16207, 12140, 804,-13160, 15893, -7005},

{ 6270,-15137, 15137, -6270,-6270, 15137,-15137, 6270, 6270,-15137, 15137, -6270, -6270, 15137,-15137, -6270, -6270, 15137,-15137, 6270, 6270,-15137, 15137, -6270, -6270, 15137,-15137, 6270},

{ 5520,-14053, 16207,-11003, 804, 9760,-15893, 14811, -7005, -3981, 13160,-16364, 12140, -2404, -8423, 15426,-15426, 8423, 2404,-12140, 16364,-13160, 3981, 7005,-14811, 15893, -9760, -804, 11003,-16207, 14053, -5520},

{ 4756,-12665, 16305,-14449, 7723, 1606,-10394, 15679,-15679, 10394, -1606, -7723, 14449,-16305, 12665, -4756, -4756, 12665,-16305, 14449, -7723, -1606, 10394,-15679, 15679,-10394, 1606, 7723,-14449, 16305,-12665, 4756},

{ 3981,-11003, 15426,-16207, 13160, -7005, -804, 8423,-14053, 16364,-14811, 9760, -2404, -5520, 12140,-15893, 15893,-12140, 5520, 2404, -9760, 14811,-16364, 14053, -8423, 804, 7005,-13160, 16207,-15426, 11003, -3981},

{ 3196, -9102, 13623,-16069, 16069,-13623, 9102, -3196, -3196, 9102,-13623, 16069,-16069, 13623, -9102, 3196, 3196, -9102, 13623,-16069, 16069,-13623, 9102, -3196, -3196, 9102,-13623, 16069,-16069, 13623, -9102, 3196},

{ 2404, -7005, 11003,-14053, 15893,-16364, 15426,-13160, 9760, -5520, 804, 3981, -8423, 12140,-14811, 16207,-16207, 14811,-12140, 8423, -3981, -804, 5520, -9760, 13160,-15426, 16364,-15893, 14053,-11003, 7005, -2404},

{ 1606, -4756, 7723,-10394, 12665,-14449, 15679,-16305, 16305,-15679, 14449,-12665, 10394, -7723, 4756, -1606, -1606, 4756, -7723, 10394,-12665, 14449,-15679, 16305,-16305, 15679,-14449, 12665,-10394, 7723, -4756, 1606},

{ 804, -2404, 3981, -5520, 7005, -8423, 9760,-11003, 12140,-13160, 14053,-14811, 15426,-15893, 16207,-16364, 16364,-16207, 15893,-15426, 14811,-14053, 13160,-12140, 11003, -9760, 8423, -7005, 5520, -3981, 2404, -804}
}

*FIG. 2 (Con't)*

- STORE, IN MEMORY, AT LEAST ONE MASTER FORWARD TRANSFORM MATRIX COMPRISING 15-BIT SIGNED CONSTANTS
  *905*

- DETERMINE, BY PROCESSING CIRCUITRY, WHICH FORWARD TRANSFORM MATRIX TO USE TO PERFORM A TRANSFORMATION BASED ON AT LEAST A TRANSFORM UNIT SIZE
  *910*

- PERFORM, BY THE PROCESSING CIRCUITRY, THE TRANSFORMATION ON RESIDUALS OF PIXEL VALUES OF A FRAME USING ONE OF THE AT LEAST ONE MASTER FORWARD TRANSFORM MATRIX OR A FORWARD TRANSFORM MATRIX DERIVED FROM ONE OF THE MASTER FORWARD TRANSFORM MATRIX BASED ON THE DETERMINATION
  *915*

*FIG. 10 (Con't)*

*1000*

{ 7723,-16305, 10394, 4756,-15678, 12664, 1606,-14449, 14449,-1606,-12664, 15678, -4756,-10394, 16305, -7723, -7723, 16305,-10394, -4756, 15678,-12664,-1606, 14449,-14449, 1606, 12664,-15678, 4756, 10394,-16305, 7723},

{ 7005,-15893, 13160, -804,-12140, 16206, -8423, -5520, 15426,-14053, 2404, 11003,-16364, 9760, 3981,-14811, 14811, -3981, -9760, 16364,-11003, -2404, 14053,-15426, 5520, 8423,-16206, 12140, 804,-13160, 15893, -7005},

{ 6270,-15137, 15137, -6270, 6270,-15137, 15137, -6270, 6270,-15137, 15137, -6270, 6270,-15137, 15137, -6270, 6270,-15137, 15137, -6270, 6270,-15137, 15137, -6270, 6270,-15137, 15137, -6270, 6270,-15137, 15137, -6270},

{ 5520,-14053, 16206,-11003, 803, 9760,-15892, 14811, -7004, -3981, 13159,-16364, 12139, -2404, -8423, 15426,-15426, 8423, 2404,-12139, 16364,-13159, 3981, 7004,-14811, 15892, -9760, -803, 11003,-16206, 14053, -5520},

{ 4756,-12666, 16305, 14449, 7724, 1606,-10394, 15679,-15679, 10394, -1606, -7724, 14449,-16305, 12666, -4756, -4756, 12666,-16305, 14449, -7724, -1606, 10394,-15679, 15679,-10394, 1606, 7724,-14449, 16305,-12666, 4756},

{ 3981,-11003, 15426,-16207, 13160, -7005, -803, 8423,-14053, 16364,-14811, 9760, -2404, -5520, 12139,-15893, 15893,-12139, 5520, 2404, -9760, 14811,-16364, 14053, -8423, 803, 7005,-13160, 16207,-15426, 11003, -3981},

{ 3196, -9102, 13622,-16069, 16069,-13622, 9102, -3196, -3196, 9102,-13622, 16069,-16069, 13622, -9102, 3196, 3196, -9102, 13622,-16069, 16069,-13622, 9102, -3196, -3196, 9102,-13622, 16069,-16069, 13622, -9102, 3196},

{ 2404, -7005, 11003,-14053, 15893,-16364, 15426,-13160, 9760, -5520, 804, 3981, -8423, 12140,-14811, 16207,-16207, 14811,-12140, 8423, -3981, -804, 5520, -9760, 13160,-15426, 16364,-15893, 14053,-11003, 7005, -2404},

{ 1606, -4756, 7723,-10394, 12665,-14449, 15679,-16305, 16305,-15679, 14449,-12665, 10394, -7723, 4756, -1606, -1606, 4756, -7723, 10394,-12665, 14449,-15679, 16305,-16305, 15679,-14449, 12665,-10394, 7723, -4756, 1606},

{ 804, -2404, 3981, -5520, 7005, -8422, 9760,-11002, 12139,-13159, 14053,-14811, 15426,-15893, 16206,-16364, 16364,-16206, 15893,-15426, 14811,-14053, 13159,-12139, 11002, -9760, 8422,-7005, 5520, -3981, 2404, -804}
};

*FIG. 10 (Con't)*

TECHNIQUES FOR PERFORMING A FORWARD TRANSFORMATION BY A VIDEO ENCODER USING A FORWARD TRANSFORM MATRIX

TECHNICAL FIELD

Embodiments described herein generally relate to techniques for processing a raw video stream. More specifically, techniques may include applying a forward transformation for encoding one or more video frames of the raw video stream.

BACKGROUND

Full-motion video displays based upon analog video signals have long been available in the form of television. With recent advances in computer processing capabilities and affordability, full-motion video displays based upon digital video signals are becoming more widely available. Digital video systems can provide significant improvements over conventional analog video systems in creating, modifying, transmitting, storing, and playing full-motion video sequences.

Digital video includes large numbers of frames that are played or rendered successively. Each frame is a still image formed from a two-dimensional array of pixels based on the display resolution of a particular system. Typically, the amount of raw digital information in video is massive, takes up a large amount of storage, and uses a significant amount of bandwidth when being transmitted.

To address the limitations in storing or transmitting such massive amounts of digital video information, various video compression standards or processes have been established. In some instances, video encoders are used to take the video data and to encode it in a format which takes up less space. As a result, the bandwidth consumed between devices that transmit and receive the video information may be used more efficiently or more data can be transmitted between those devices in the same time.

BRIEF DESCRIPTION OF THE DRAWINGS

FIG. 2 illustrates an exemplary embodiment of a 32×32 DCT forward transform matrix.

FIG. 3 illustrates another exemplary embodiment of a 4×4 ADST forward transform matrix.

FIG. 9 illustrates an exemplary embodiment of a first logic flow.

FIG. 10 illustrates a second exemplary embodiment of a 32×32 DCT forward transform matrix.

FIG. 11 illustrates a second exemplary embodiment of a 16×16 DCT forward transform matrix.

FIG. 12 illustrates a second exemplary embodiment of an 8×8 DCT forward transform matrix.

FIG. 13 illustrates a second exemplary embodiment of a 16×16 ADST forward transform matrix.

FIG. 14 illustrates a second exemplary embodiment of an 8×8 ADST forward transform matrix.

DETAILED DESCRIPTION

Figure 1:
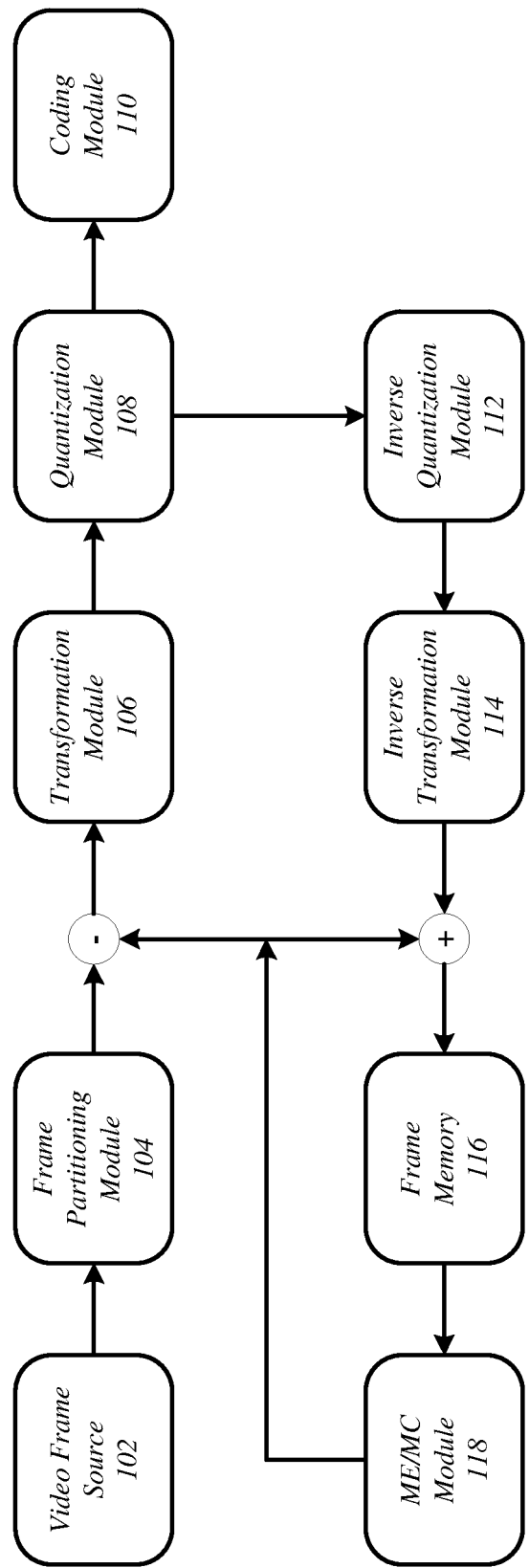
FIG. 1 illustrates an exemplary embodiment of a video frame processing system.

Various embodiments are generally directed to an apparatus, system and method for performing a forward transformation on a video stream using a forward transform matrix. The video frames may be encoded and the forward transform matrix may be based on the VP9 video compression standard developed by the Google® Corporation. However, various embodiments may not be limited in this manner and various aspects of the following description may be applied to any encoding standard such as the International ITU-T International Organization for Standardization (ISO) video compression standard known as ITU-T/ISO H.264 or as advanced video codec (AVC) and MPEG-4 Part 10. Further, the video frames may be processed according to the High Efficiency Video Coding (HEVC) video compression standard, a successor to H.264/MPEG-4 AVC (Advanced Video Coding) that was jointly developed by the ISO/IEC Moving Picture Experts Group (MPEG) and ITU-T Video Coding Experts Group (VCEG) as ISO/IEC 23008-2 MPEG-H Part 2 and ITU-T H.265.

In some embodiments, forward transform matrices may be derived or generated from linear transformation algorithms or processes based on at least one of the standards, such as VP9. The forward transform matrices for particular transform unit sizes and types may be generated by converting each stage of a linear transformation algorithm into intermediate matrices and summing the intermediate matrices to create a final forward transform matrix. As will be discussed in more detail below, various improvements may be realized by deferring rounding that normally occurs after each intermediate stage until the final stage or when the final forward transform matrix is generated. These forward transform matrices with deferred rounding may produce better results than when the actual linear transformation algorithms or processes are used.

Another advantage that may be realized by utilizing deferred rounding is the ability to derive or generate forward transform matrices from another forward transform matrix. For example, various embodiments may include a 32×32 discrete cosine transform (DCT) forward transform matrix and a 16×16, an 8×8 and a 4×4 DCT forward transform matrix may be generated from the 32×32 DCT forward transform matrix. In addition, a 16×16 and an 8×8 asymmetric discrete sine transform (ADST) forward transform matrix may be generated from the 32×32 DCT forward transform matrix. In various embodiments, the 32×32 DCT forward transform may be a master forward transform matrix. Various embodiments may also include a 4×4 ADST forward transform matrix. However, due to its uniqueness it may not be derived from the 32×32 DCT forward transform matrix and may also be considered a master forward transform matrix.

Further, due to considerable processing requirements when these forward transform matrices are derived from the linear transformation algorithms these forward transform matrices are typically hardwired on chip or stored in memory, such as read-only memory or in circuitry, at chip development time. However, deriving the forward transform matrices from another forward transform matrix is not processing intensive and can be done during runtime. These forward transform matrices derived during runtime may be stored in memory, such as random access memory (RAM). Thus, significant on-chip space savings may also be realized because only the master forward transform matrices need to be generated and stored in memory or hardwired at chip development time.

However, various embodiments are not limited to forward transform matrices with deferred rounding and other forward transformation matrices including rounding after each intermediate stage may be generated. These forward transformation matrices with intermediate rounding may be used if a decoder requires the outputs to be same as those generated by the linear transformation algorithms, for example. These and other details will become apparent with the following description.

Various embodiments also relate to an apparatus or systems for performing these operations. This apparatus may be specially constructed for the required purpose or it may include a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates an embodiment of a video frame processing system 100 to process information and pixel data. In particular, video frame processing system 100 may be used to encode one or more frames of a video stream. The video frame processing system 100, however, is not intended to suggest any limitation as to scope of use or functionality, as the techniques and tools may be implemented in diverse general-purpose or special-purpose computing environments. Accordingly, video frame processing system 100 may include a video source 102, a frame partition module 104, a transformation module 106, a quantization module 108, and a coding module 110. In some embodiments, the video frame processing system 100 may include an inverse quantization module 112, an inverse transformation module 114, frame memory 116 and a motion estimation/motion compensation (ME/MC) module 118 to provide feedback information for processing the video stream.

The original, full information content video signal, e.g., in analog format, may be provided to the video frame source 102. The video frame source 102 may perform various functions such as, digitization of the video signal into a luminance (luma) and chrominance (chroma) format, e.g., YCbCr, YUV, YIQ, and YCC family of color spaces. Those skilled in the art will appreciate that for the YCbCr color space Y is the luma component and Cb and Cr are the chroma components; for the YUV color space Y is the luma component and U and V are the chroma components; for the YIQ color space Y is the luma component and I and Q are the respective in-phase and quadrature chroma components; and for the YCC color space Y is the luma component and C (Cb) and C (Cr) are the chroma components. Various embodiments are not limited in this manner and the video frame source 102 may perform various functions such as, digitization of the video signal based on the red, green, blue (RGB) color model to produce a broad array of colors.

The video frame source 102 may provide the formatted digitized video signals to the frame partition module 104. Regardless of the particular video format, the video frame source 102 may perform the necessary processing to supply a full-information digital video signal version of the original analog video signal to the frame partition module 104. In various embodiments, the video frame source 102 may be a transmission medium or a stored file. The video frame source 102 may provide the digital video signal sequences in the form of pictures or video frames to the frame partition module 104.

The architecture and the core building blocks of the video processing system 100 may be based on motion-compensated transform coding and may perform various motion vector and mode computations and include intra-prediction and inter-prediction. For example, the frame partition module 104 may compress by partitioning a frame as one or more regions, where each region may include one or more blocks or transform units. In some embodiments, the transform units may be defined as blocks of 16×16 luma pixels (or samples) with corresponding chroma samples. Each transform unit may also be divided into one or more sub-block partitions for motion-compensated prediction. In the same or other embodiments, the transform units may be different transform unit sizes, such as a 4×4 block of pixels, an 8×8 block of pixels, a 32×32 block of pixels and so forth and may be based on the standard used for encoding.

The frame processing system 100 may process and perform a prediction for the transform units. More specifically, an intra-prediction and an inter-prediction may be performed by the ME/MC module 118. The intra-prediction may work within a current video frame being processed and is based upon the compressed and decoded information available for the transform unit being predicted for neighboring pixels. The inter-prediction may be used for motion composition based on a similar region on previously coded pixels close to the current transform unit. A prediction may be used to reduce data redundancy, and therefore, not store excessive information in the coded stream.

In various embodiments, the frame processing system 100 may perform the prediction and subtract predicted values from the original information of the transform units to get residual values or residuals that are compressed. The residuals may be sent to the transformation module 106 for processing and to transform the residuals into the frequency domain by utilizing a forward transformation matrix. Further reducing the spatial redundancy of the residual information.

The transformation module 106 may perform a forward transformation on the residuals by utilizing a forward transform matrix for a particular transform size and type. More specifically, a number of forward transform matrices may be used to perform the forward transformation including a 32×32, 16×16, 8×8 and 4×4 discrete cosine transform (DCT) matrices and 16×16, 8×8 and 4×4 asymmetric discrete sine transform (ADST) matrices. The transform module 106 may determine which forward transform matrix to use to perform a forward transformation including, a transform unit size, predictions (intra and inter), and intra-mode. For example, a forward transform matrix having the same transform unit size as the transform unit may be chosen to perform the forward transformation.

In various embodiments, the forward transform matrices may be generated by converting each stage of a linear transformation algorithm or process for a particular standard. For example, a VP9 reference algorithm or process may be used to generate or create the forward transform matrices for each transform size and type. The forward transform matrices may be generated by converting each stage of the linear transformation algorithm or process into a matrix and replacing intermediate rounding with precise division by $2^{14}$. These intermediate matrices may be multiplied together to generate a single matrix for each transform unit size and type with rounding deferred until the end.

However in the same or other embodiments, other forward transform matrices, as illustrated in FIGS. 10-14, may be generated based on a linear transformation algorithm or process, such as the VP9 reference algorithm, and include rounding after each stage. In particular, rounding may occur after each intermediate matrix is generated and the final matrix may be the sum total of these intermediate matrices. The final matrices with intermediate rounding are slightly different than matrices having deferred rounding.

In some embodiments, one or more master forward transform matrices may be generated and stored in memory or hardwired in one or more processing chips. A master transform matrix may be any matrix stored in memory and/or used to generate other forward transform matrices. More specifically, at least one of the master forward transform matrices may be used to derive other forward transform matrices used to perform the forward transformation on the residuals. For example, a 32×32 discrete cosine transform (DCT) forward transform matrix may be stored in memory or hardwired into one or more processing chips and other forward transform matrices, such as a 16×16, 8×8 and 4×4 DCT forward transform matrix and a 16×16 and 8×8 ADST forward transform matrix may be generated from the 32×32 DCT matrix. The forward transform matrices including the master forward transform matrices may include signed constants. The signed constants may have a defined number of precision bits and a sign bit. More specifically and in some embodiments, the forward transform matrices include signed constants such as 15-bit signed constants that require 15-bits of storage, 14 numerical precision bits and a sign bit. However, some embodiments are not limited to 15-bit signed constants and the defined number of signed constants may be any number.

One of the master forward transform matrix used to derive other forward transform matrices may be a 32×32 DCT forward transform matrix based on equation 1:

$$DCT[N]_{row,col} = 2^{14} \frac{\sqrt{2}^{log_2 N - 2}}{\sqrt{N}} \begin{cases} \sqrt{2}, & row = 0 \\ 2\cos\left(\frac{\pi\ row}{N}\left(col + \frac{1}{2}\right)\right), & row > 0 \end{cases},$$

where N=32.

More specifically, equation 1 may be used to generate a 32×32 DCT forward transform matrix having the defined number of signed bit signed constants, as illustrated in FIG. 2. Further, equation 1 may be used to determine other DCT forward transform matrix including a 4×4 DCT forward transform matrix when N=4, a 8×8 DCT forward transform matrix when N=8, and a 16×16 DCT forward transform matrix when N=16. However, as will be described in more detail, the 32×32 DCT forward transform matrix may be used as a master forward transform matrix and the 4×4, 8×8 and 16×16 DCT forward transform matrices may be derived from 32×32 DCT forward transform matrix.

Generating forward transform matrices based on equation 1 is generally processor intensive and in most cases not feasible to compute while a computing system is processing a video stream. The forward transform matrices may be generated prior to processing a video stream and stored on chip, such as a processing unit, graphics processing unit, a memory and so forth to reduce computation time. Thus, on chip savings may be realized by deriving forward transform matrices from a master forward transform matrix, such as the 32×32 DCT forward transform matrix, because only the master forward matrix is required to be saved in hardware. Deriving the forward transform matrices from a master transform matrix may be done during run-time and stored in memory such as random access memory (RAM) or some other buffer.

In some embodiments, the transformation module 106 may perform a transformation using an asymmetric discrete sine transform (ADST), based on equation 2:

$$ADST[N]_{row,col} = \\ 2^{14} \frac{\sqrt{2}^{log_2 N - 2}}{\sqrt{N}} \begin{cases} 2\sin\left(\frac{\pi(row+1)}{N}\left(col1 + \frac{1}{2}\right)\right), & row < N - 1 \\ \sqrt{2}\,(-1)^{col}, & row = N - 1 \end{cases}$$

where N=8 or 16.

Equation 2 may be used to generate the 8×8 ADST forward transform matrix and the 16×16 ADST forward transform matrix. However, the 8×8 and 16×16 ADST forward transform matrices may also be derived from the 32×32 DCT master forward transform matrix. Again, saving processing power and additional on-chip space by only requiring that the 32×32 master forward transform matrix is stored in memory.

In some embodiments, the transformation module 106 may perform a transformation using a 4×4 ADST forward transform matrix. However, this matrix may not be generated by equation 2, but may be determined using other methods. In addition, the 4×4 ADST forward transform matrix may not be derived from the 32×32 DCT forward transform matrix and as such may be stored in hardware as a master forward transform matrix. As such, various embodiments may including storing the 32×32 DCT forward transform matrix and the 4×4 ADST forward transform matrix as master transform matrices.

The transformation module 106 may determine which forward transform matrix to apply to the residuals based on inter-prediction and intra-prediction, the transform unit or block size and the intra-mode. For example, if the transform unit or block size is 32×32 pixels, the 32×32 DCT forward transform matrix is used to perform the forward transformation. In another example, if the transform unit utilizes chroma coloring, the DCT forward transform matrix having the same size as the transform unit is used to perform the transformation. The transformation module 106 may perform the transformation on the residuals, and generate coefficients in the frequency domain to be quantized by the quantization module 108.

The quantization module 108 module receives the coefficients to generate a high efficient loss compression and to remove insufficient information. The remaining information may be sent to the coding module 110 and may be encoded. In some embodiments, entropy coding may be applied by the coding module 110 to generate a compressed bit stream. For example, and 8-bit arithmetic coding engine, such as a bool-coder may encode the information into a bit-stream.

In various embodiments, the video frame processing system 100 may include an inverse quantization module 112 to inversely quantize image information generated by the quantization module 108. An inverse transformation module 106 may perform an inverse transformation on the inversely quantized data. In some embodiments, the inverse transformation module 114 may use an inverse transform matrix based on the forward transform matrix utilized by the transformation module 114. The restored residuals of the inverse transformation may be sent to frame memory 116. The frame memory 116 may be any type of memory including ROM, RAM, and so forth.

In various embodiments, the video frame processing system 100 may include a motion estimation and compensation (ME/MC) module 118 to perform various predictions for the frames. In some embodiments, the ME/MC module 118 may perform intra-prediction and inter-predictions. The restored residuals and the predicted values may be summed up to generate restored pixel values, identical to those achieved during a decoding process. An additional frame post-processing stage may optionally be performed to eliminate image blockiness introduced by the forward transformation and quantization. This information may be stored in memory, such as the frame memory 116 for inter-prediction and further frames.

FIG. 2 illustrates an exemplary embodiment of a 32×32 DCT forward transform matrix 200. The 32×32 DCT forward transform matrix 200 is a master forward transform matrix that may be used to generate or derive other forward transform matrices, such as the 4×4, 8×8 and 16×16 DCT forward transform matrices and the 8×8 and 16×16 ADST forward transform matrices. The 32×32 DCT forward transform matrix 200 may also be used during encoding of a video stream to generate coefficients for further processing. The 32×32 DCT forward transform matrix 200 may include signed constants generated from equation 1, such as 15-bit signed constants. In various embodiments, the 32×32 DCT forward transform matrix 200 may be stored in memory, such as a read-only memory as part of the a computing processing unit, a graphics processing unit, or any other processing component. In the same or other embodiments, the 32×32 DCT forward transform matrix 200 may be hardwired in processing circuitry such as a computing processing unit or a graphics processing unit.

The 32×32 DCT forward transform matrix 200 may be an approximation of linear transformation process, such as the VP9 reference algorithm or process to perform a transformation on 32×32 block of pixels. In practice, the 32×32 DCT forward transform matrix 200 outperforms the VP9 reference algorithm. More specifically, the VP9 reference algorithm includes arithmetic to conduct a sequence of linear transformations utilizing linear algebra for performing a forward transformation. The VP9 reference algorithm includes a number of stages and after each intermediate stage the results are rounded introducing imprecision. More specifically, due to the rounding in the intermediate stages, the VP9 algorithm may produce less than optimal results or a transformation that is less accurate to mathematically constructed results having infinite precision. Significant logic parallelization and data-path reuse may be realized by converting the VP9 reference algorithm into the 32×32 DCT forward transform matrix 200 by deferring any rounding when generating intermediate matrices until the final matrix is generated. Further, by converting the VP9 reference algorithm into matrix form, such as the 32×32 DCT forward transform matrix 200, the gate count to store the matrix in hardware may be significantly reduced compared to implementing the VP9 reference algorithm in hardware.

FIG. 3 illustrates an exemplary embodiment of a 4×4 ADST forward transform matrix 300 that may be also used during encoding of a video stream. The 4×4 ADST forward transform matrix 300 may include signed constants, such as 15-bit signed constants. As previously discussed, the 4×4 ADST forward transform matrix 300 may be unique and may not be derived from the 32×32 DCT forward transform matrix. As such, the 4×4 ADST forward transform matrix 300 may be a master forward transform matrix and also may be stored in memory, such as a read-only memory as part of a computing processing unit, a graphics processing, or any other processing component or may be hardwired on chip.

The 4×4 ADST forward transform matrix 300 may be generated from the VP9 reference algorithm with deferred rounding to achieve significant logic parallelization and data-path reuse. Further, by converting the VP9 reference algorithm into the 4×4 ADST forward transform matrix 300 the gate count to store the matrix in hardware may be significantly reduced compared to implementing the VP9 reference algorithm in hardware.

Consistent with some embodiments, the master transform matrices 200 and 300 may be designed in a semiconductor chip at the chip design stage. The signed constants may be input, for example, via registers into the semiconductor chip, which is installed in a device, such as computing device 1505 of FIG. 15 or computing system 1600 of FIG. 16. When a device or system subsequently processes image data and information, the appropriate master transform matrix may be used to perform a transformation or to generate another transform matrix to perform a transformation. Thus, in various embodiments only the master transform matrices need to be prestored in hardware, which may be designed according to the characteristics of an encoding/decoding scheme.

Figure 4A:
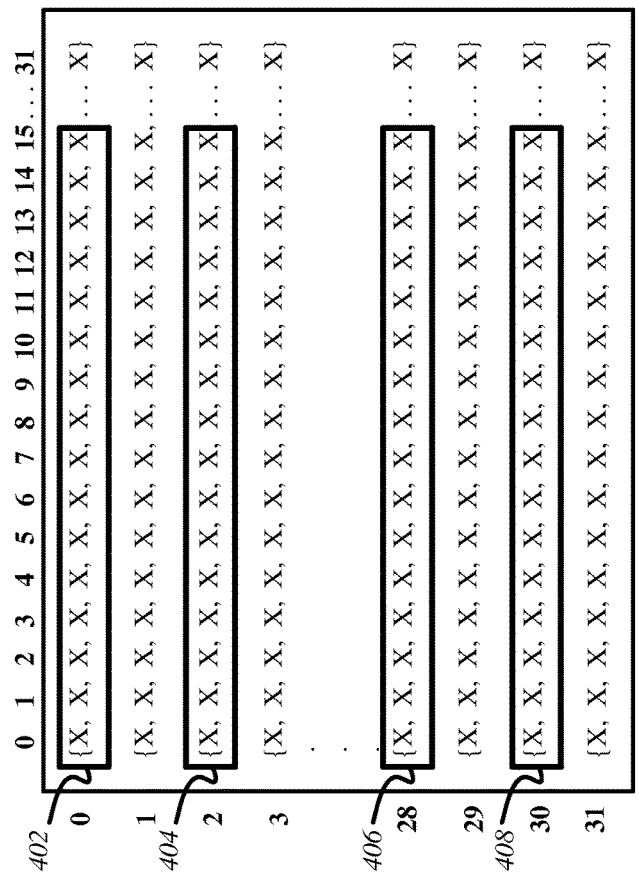
FIGS. 4A/4B illustrate an exemplary embodiment for deriving a 16×16 DCT forward transform matrix.

FIG. 4A/4B illustrate an exemplary embodiment of the derivation of a 16×16 DCT forward transform matrix 450. More specifically, FIG. 4A illustrates the derivation of a 16×16 DCT forward transform matrix from the 32×32 DCT forward transform matrix illustrated in FIG. 2. FIG. 4A replaces "X" for the signed constants illustrated in FIG. 2 for illustrative purposes only. Actual signed constants are used when the 16×16 DCT forward transform matrix is derived from the 32×32 DCT forward transform matrix.

FIG. 4A illustrates 32 columns from 0-31 and 32 rows from 0-31 of the 32×32 DCT forward transform matrix 200. Various embodiments may not be limited in this manner and the rows and columns may be numbered in any manner. The 16×16 DCT forward transform matrix 450 may be derived from the first 16 columns of the 32×32 DCT forward transform matrix 200 and every other row of the 32×32 DCT forward transform matrix 200 starting with the first row. For example, row 402 highlighted in FIG. 4A may be the first row of the 16×16 DCT forward transform matrix 450. Row 404 may be the next row in the 16×16 DCT forward transform matrix 450, and so on. Rows 406 and 408 corresponding with rows 28 and 30 of the 32×32 DCT forward transform matrix 200 may be the last two rows of the 16×16 DCT forward transform matrix 450.

FIG. 4B illustrates the 16×16 DCT forward transform matrix 450 derived from the 32×32 DCT forward transform matrix 200. As can be seen in FIG. 4B, the 16×16 DCT forward transform matrix 450 includes the same signed constants as the first 16 columns and every other row of the 32×32 DCT forward transform matrix 200. In various embodiments, the derivation of a forward transform matrix may occur during run-time or when a video stream is being encoded or prior to the encoding of the video stream and may be stored in a temporary memory. Various embodiments are not limited in this manner and in some embodiments the 16×16 DCT forward transform matrix 450 may be generated from equation 1 and prestored or hardwire on chip.

Figure 5A:
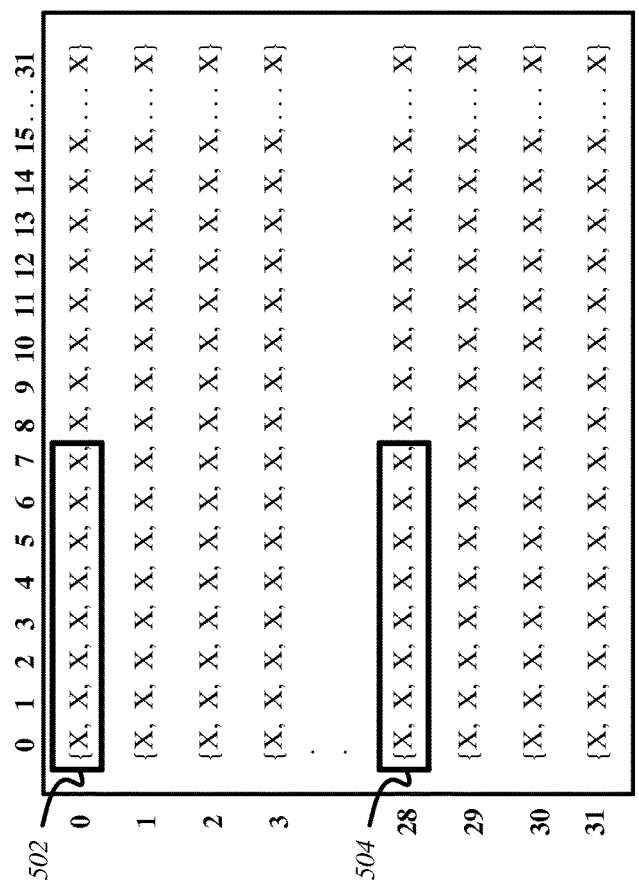
FIGS. 5A/5B illustrate an exemplary embodiment for deriving a 8×8 DCT forward transform matrix.

FIG. 5A/5B illustrate an exemplary embodiment of the derivation of an 8×8 DCT forward transform matrix 550. More specifically, FIG. 5A illustrates the derivation of an 8×8 DCT forward transform matrix 550 from the 32×32 DCT forward transform matrix 200 illustrated in FIG. 2. FIG. 5A replaces "X" for the signed constants illustrated in FIG. 2 for illustrative purposes only. Actual signed constants are used when the 8×8 DCT forward transform matrix 550 is derived from the 32×32 DCT forward transform matrix 200.

FIG. 5A illustrates 32 columns from 0-31 and 32 rows from 0-31 of the 32×32 DCT forward transform matrix 200. Various embodiments may not be limited in this manner and the rows and columns may be numbered in any manner. The 8×8 DCT forward transform matrix 550 may be derived from the first eight columns and every fourth row of the 32×32 DCT forward transform matrix 200 starting with the first row. For example, row 502 highlighted in FIG. 5A may be the first row of the 8×8 DCT forward transform matrix 550. Row 504 may be the last row in the 8×8 DCT forward transform matrix.

FIG. 5B illustrates the 8×8 DCT forward transform matrix 550 derived from the 32×32 DCT forward transform matrix 200. As can be seen in FIG. 5B, the 8×8 DCT forward transform matrix 550 includes the same signed constants as the first eight columns and every fourth row of the 32×32 forward transform matrix. In various embodiments, the derivation of a forward transform matrix may occur during run-time, when a video stream is being encoded or prior to the encoding of the video stream and may be stored in a temporary memory.

In some embodiments, the 8×8 DCT forward transform matrix 550 may be derived from the 16×16 DCT forward transform matrix 450. More specifically, the first eight columns and every other row of the 16×16 DCT forward transform matrix 450 may be used to determine the 8×8 DCT forward transform matrix 550. Various embodiments are not limited in this manner and in some embodiments the 8×8 DCT forward transform matrix 550 may be generated from equation 1 and may be prestored or hardwired on chip.

Figure 6A:
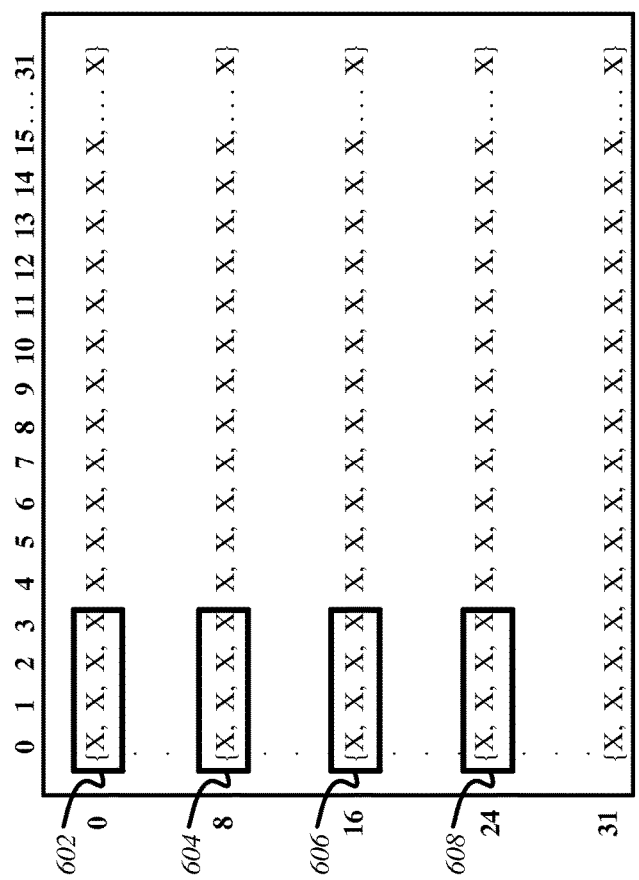
FIGS. 6A/6B illustrate an exemplary embodiment for deriving a 4×4 DCT forward transform matrix.

FIG. 6A/6B illustrate an exemplary embodiment of the derivation of a 4×4 DCT forward transform matrix 650. More specifically, FIG. 6A illustrates the derivation of a 4×4 DCT forward transform matrix 650 from the 32×32 DCT forward transform matrix 200 illustrated in FIG. 2. FIG. 6A replaces "X" for the signed constants illustrated in FIG. 2 for illustrative purposes only. Actual signed constants are used when the 4×4 DCT forward transform matrix 650 is derived from the 32×32 DCT forward transform matrix 200.

FIG. 6A illustrates 32 columns from 0-31 and 32 rows from 0-31 of the 32×32 DCT forward transform matrix 200. Various embodiments may not be limited in this manner and the rows and columns may be numbered in any manner. The 4×4 DCT forward transform matrix 550 may be derived from the first four columns and every eighth row of the 32×32 DCT forward transform matrix 200 starting with the first row. For example, row 602 highlighted in FIG. 6A may be the first row of the 4×4 DCT forward transform matrix 650. Row 604 may be the next row of the 4×4 DCT forward transform matrix 650. Row 606 may be the third row of the 4×4 DCT forward transform matrix 650 and row 608 may be the last row of the 4×4 DCT forward transform matrix 650.

FIG. 6B illustrates the 4×4 DCT forward transform matrix 650 derived from the 32×32 DCT forward transform matrix 200. As can be seen in FIG. 6B, the 4×4 DCT forward transform matrix 650 includes the same signed constants as the first four columns and every eighth row of the 32×32 forward transform matrix 200. In various embodiments, the derivation of a forward transform matrix may occur during run-time, when a video stream is being encoded or prior to the encoding of the video stream and may be stored in a temporary memory.

In some embodiments, the 4×4 DCT forward transform matrix 650 may be derived from the 8×8 DCT forward transform matrix 550. More specifically, the first four columns and every other row of the 8×8 DCT forward transform matrix 550 may be used to determine the 4×4 DCT forward transform matrix 650. Various embodiments are not limited in this manner and in some embodiments the 8×8 DCT forward transform matrix 550 may be generated from equation 1 or may be derived from the 16×16 forward transform matrix 450. Further, the 4×4 DCT forward transform matrix 650 may be prestored or hardwired on chip.

Figure 7A:
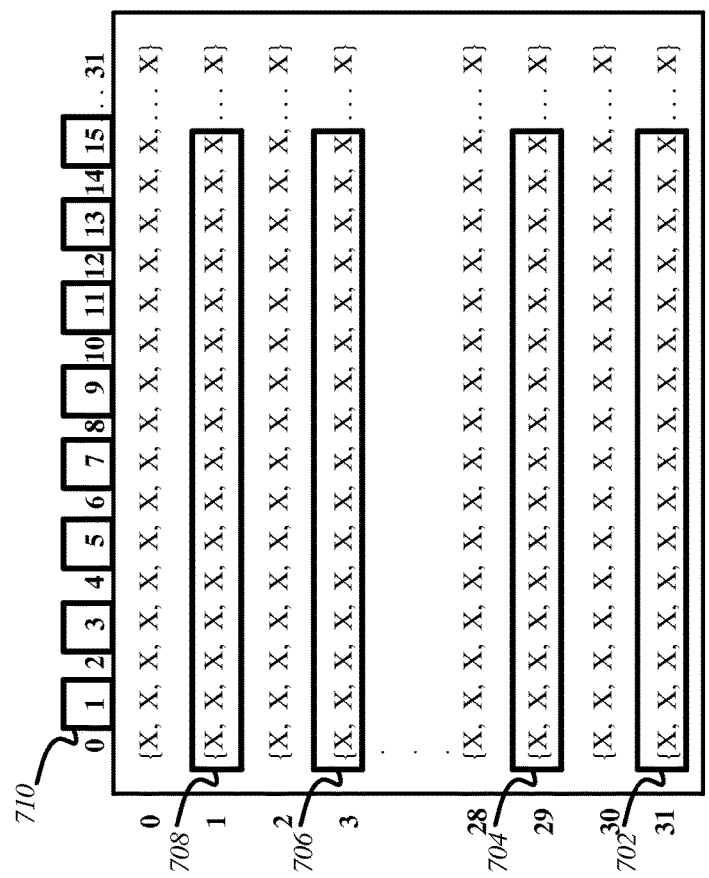
FIGS. 7A/7B illustrate an exemplary embodiment for deriving a 16×16 ADST forward transform matrix.

FIG. 7A/7B illustrate an exemplary embodiment of the derivation of a 16×16 ADST forward transform matrix 750. More specifically, FIG. 7A illustrates the derivation of a 16×16 ADST forward transform matrix 750 from the 32×32 DCT forward transform matrix 200 illustrated in FIG. 2. FIG. 7A replaces "X" for the signed constants illustrated in FIG. 2 for illustrative purposes only. Actual signed constants are used when the 16×16 ADST forward transform matrix 750 is derived from the 32×32 DCT forward transform matrix 200.

FIG. 7A illustrates 32 columns from 0-31 and 32 rows from 0-31 of the 32×32 DCT forward transform matrix 200. Various embodiments may not be limited in this manner and the rows and columns may be numbered in any manner. The 16×16 ADST forward transform matrix 750 may be derived from the first 16 columns starting from the first column and negating every other column 710 (starting with the second column) of the 32×32 DCT transform matrix 200. Further, the rows of the 16×16 ADST transform matrix 750 may be derived from every other row of the 32×32 DCT forward transform matrix 200 starting with the last row going in reverse order. For example, row 702 highlighted in FIG. 7A may be the first row of the 16×16 ADST forward transform matrix 750. Row 704 may be the next row of the 16×16 DCT forward transform matrix 750, and so on. Row 706 may be the second to last row of the 16×16 ADST forward transform matrix 750 and row 708 may be the last row of the 16×16 ADST forward transform matrix 750. Thus, the rows of the 16×16 ADST matrix may be rows "31, 29, 27, 25 . . . 3, 1" of the 32×32 DCT forward transform matrix.

FIG. 7B illustrates the 16×16 ADST forward transform matrix 750 derived from the 32×32 DCT forward transform matrix 200. As can be seen in FIG. 7B, the 16×16 ADST forward transform matrix 750 includes the same signed constants as the first 16 columns negating every other column and every other row in reverse order of the 32×32 forward transform matrix 200. In various embodiments, the derivation of a forward transform matrix may occur during run-time, when a video stream is being encoded or prior to the encoding of the video stream and may be stored in a temporary memory. Further, the 16×16 ADST forward transform matrix 750 may be generated based on equation 2 and prestored or hardwired on chip.

Figure 8A:
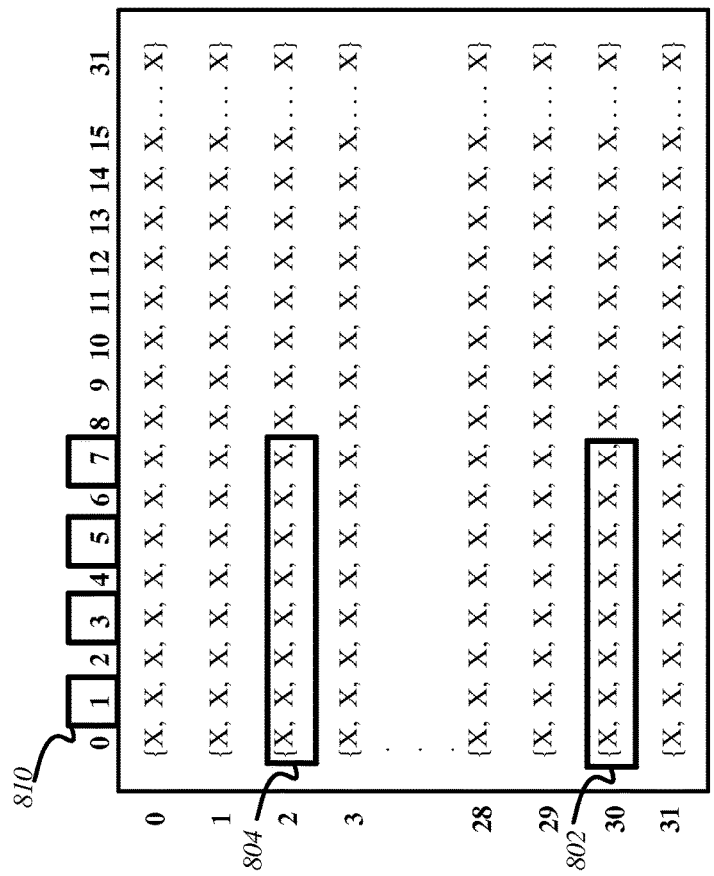
FIGS. 8A/8B illustrate an exemplary embodiment for deriving a 8×8 ADST forward transform matrix.

FIG. 8A/8B illustrate an exemplary embodiment of the derivation of an 8×8 ADST forward transform matrix 850. More specifically, FIG. 8A illustrates the derivation of an 8×8 ADST forward transform matrix 850 from the 32×32 DCT forward transform matrix 200 illustrated in FIG. 2. FIG. 8A replaces "X" for the signed constants illustrated in FIG. 2 for illustrative purposes only. Actual signed constants are used when the 8×8 ADST forward transform matrix 850 is derived from the 32×32 DCT forward transform matrix 200.

The 8×8 ADST forward transform matrix 850 may be derived from the first eight columns starting from the first column and negating every other column 810 (starting with the second column) of the 32×32 DCT transform matrix 200. Further, the rows of the 8×8 ADST transform matrix 750 may be derived from every fourth row of the 32×32 DCT forward transform matrix 200 starting with the second to last row going in reverse order. For example, row 802 highlighted in FIG. 8A may be the first row of the 8×8 ADST forward transform matrix 850 and row 804 may be the last row of the 8×8 ADST forward transform matrix 850, and so on. Thus, the rows of the 8×8 ADST matrix may be rows "30, 26, 22 . . . 2" of the 32×32 DCT forward transform matrix.

FIG. 8B illustrates the 8×8 ADST forward transform matrix 850 derived from the 32×32 DCT forward transform matrix 200. As can be seen in FIG. 8B, the 8×8 ADST forward transform matrix 850 includes the same signed constants as the first eight columns negating every other column and every fourth row in reverse order of the 32×32 forward transform matrix 200. In various embodiments, the derivation of the forward transform matrix may occur during run-time, when a video stream is being encoded or prior to the encoding of the video stream and may be stored in a temporary memory. In some embodiments, the 8×8 ADST forward transform matrix 850 may be generated based on equation 2 and prestored or hardwired on chip.

FIG. 9 illustrates an embodiment of a first logic flow 900 for performing a transformation using a forward transform matrix. The logic flow 900 may be representative of some or all of the operations executed by one or more embodiments described herein. For example, the logic flow 900 may illustrate operations performed by the systems 100.

In the illustrated embodiment shown in FIG. 9, the logic flow 900 may include storing, in memory, at least one master forward transform matrix comprising signed constants, at block 900. The at least one master forward transformation matrix may be a 32×32 DCT forward transform matrix in which other forward transform matrices may be derived from. In some embodiments, a 4×4 ADST forward transform matrix may also be stored in memory, alone or in combination, with the 32×32 DCT forward transform matrix and as a master forward transform matrix. Each of the master transform matrices may include a number of signed constants. For example, the 32×32 DCT forward transform matrix may include 1024 signed constants and the 4×4 ADST forward transform matrix may include 16 signed constants, each matrix is used to perform a forward transformation.

In some embodiments, logic flow 900 may include determining, by processing circuitry, which forward transform matrix to use to perform a forward transformation based on at least a transform unit size. More specifically, a forward transform matrix having the same size as the transform unit size of the transform unit (or block) for transformation may be selected. For example, a 32×32 DCT forward transform unit may be selected for a transform unit having a transform unit size of 32×32 blocks of pixels.

Logic flow 900 may also include performing, by processing circuitry, the transformation on residuals of pixel values of a frame using one of the at least one master forward transform matrix or a forward transform matrix derived from one of the master forward transform matrix based on the determination at block 915. As previously discussed residuals or residual values may be calculated for a frame and a forward transformation may be performed on the residuals. The forward transformation may be performed by using one of the master forward transform matrices or a forward transform matrix derived from one of the master forward transform matrix. As previously discussed, the 8×8 and 16×16 ADST forward transform matrices and the 4×4, 8×8 and 16×16 DCT forward transform matrices may all be derived from the 32×32 DCT forward transform matrix.

FIGS. 10-14 illustrate additional exemplary embodiments of forward transform matrices 1000-1400 for performing a forward transform on residual values. These forward transform matrices may be similar to, but not the same as, the forward transform matrices previously discussed with respect to FIGS. 2-8B. These forward transform matrices may be derived from the VP9 reference algorithm, but account for rounding introduced during each of the linear transformation stages. More specifically, an intermediate matrix may be generated after each linear transformation stage and include rounding as introduced by the VP9 reference algorithm. FIGS. 10-14 illustrate the final forward transform matrices for each of the transform unit sizes and types based on the intermediate matrices including rounding. The forward transform matrices in FIGS. 10-14 may be used to generate outputs that mirror the outputs generated by using the VP9 reference algorithms themselves. This may be advantageous if a decoder for decoding the video stream requires the outputs to be same as those generated by the VP9 reference algorithm.

Figure 10:
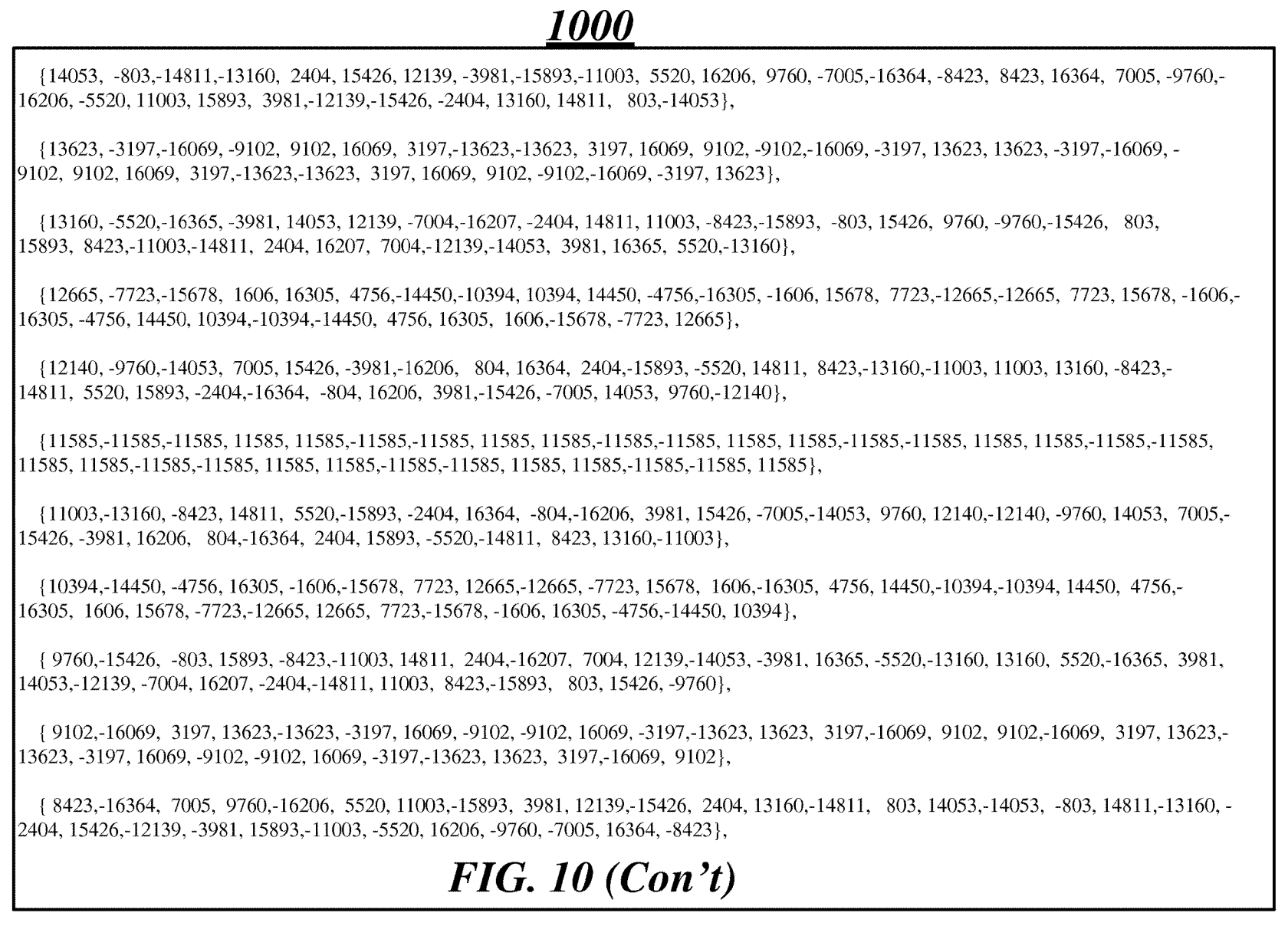

FIG. 10 illustrates a 32×32 DCT forward transform matrix, FIG. 11 illustrates a 16×16 DCT forward transform matrix, FIG. 12 illustrates a 8×8 DCT forward transform matrix, FIG. 13 illustrates a 16×16 ADST forward transform matrix and FIG. 14 illustrates a 8×8 ADST forward transform matrix. Each of these matrices may include signed constants. However, due to the rounding introduced between each linear operation stage none of the forward transform matrices 1000-1400 may be derived from another forward transform matrix. As such, each of the forward transform matrices 1000-1400 may be stored in memory or hardwired into one or more chips such that they may be quickly retrieved to perform a forward transformation.

Figure 15:
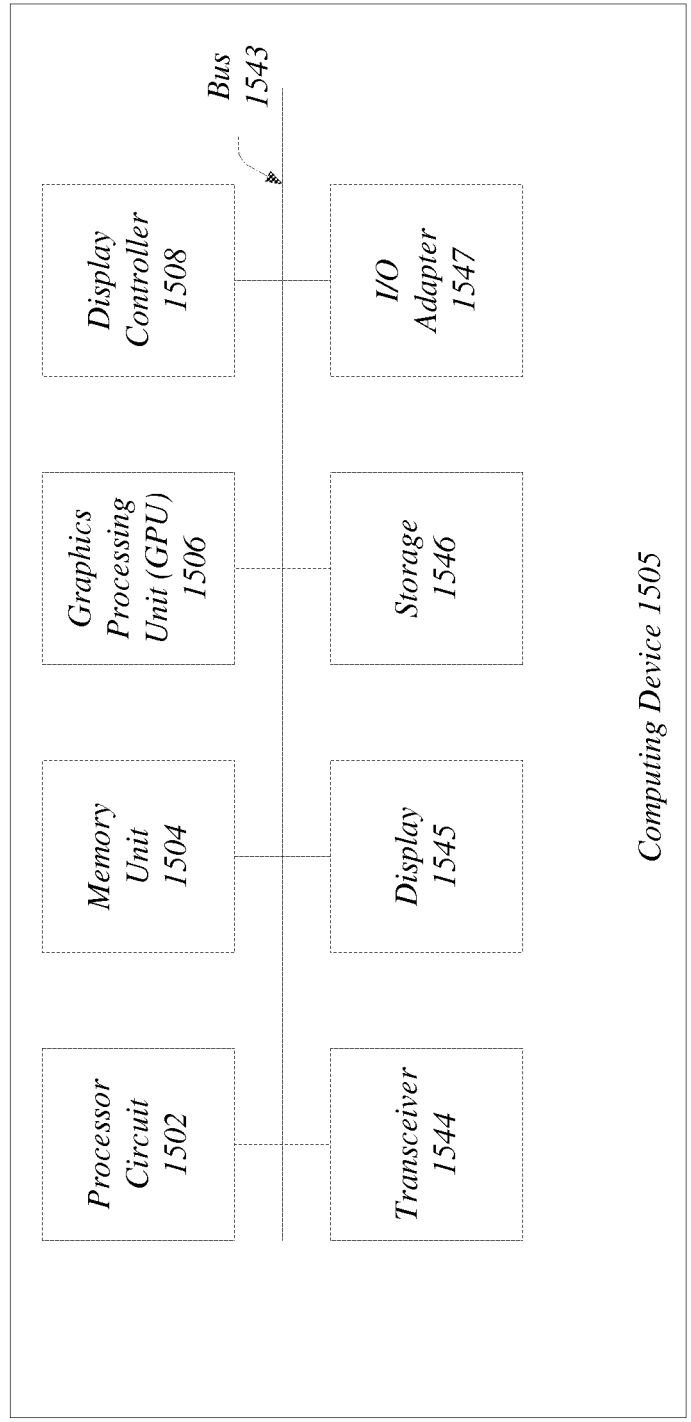
FIG. 15 illustrates an exemplary embodiment of a computing system.

FIG. 15 illustrates one embodiment of a system 1500. In various embodiments, system 1500 may be representative of a system or architecture suitable for use with one or more embodiments described herein, such as system 100 of FIG. 1. The embodiments are not limited in this respect.

As shown in FIG. 15, system 1500 may include multiple elements. One or more elements may be implemented using one or more circuits, components, registers, processors, software subroutines, modules, or any combination thereof, as desired for a given set of design or performance constraints. Although FIG. 15 shows a limited number of elements in a certain topology by way of example, it can be appreciated that more or less elements in any suitable topology may be used in system 1500 as desired for a given implementation. The embodiments are not limited in this context.

In various embodiments, system 1500 may include a computing device 1505 which may be any type of computer or processing device including a personal computer, desktop computer, tablet computer, netbook computer, notebook computer, laptop computer, server, server farm, blade server, or any other type of server, and so forth.

Other examples of computing device 1505 also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a computing device 1505 may be implemented as a smart phone capable of executing computer applications, as well as voice communications and/or data communications. Although some embodiments may be described with a computing device 1505 implemented as a smart phone by way of example, it may be appreciated that other embodiments may be implemented using other wireless computing devices as well. The embodiments are not limited in this context.

In various embodiments, computing device 1505 may include processor circuit 1502. Processor circuit 1502 may be implemented using any processor or logic device. The processing circuit 1502 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The processing circuit 1502 may be connected to and communicate with the other elements of the computing system via an interconnect 1543, such as one or more buses, control lines, and data lines.

In one embodiment, computing device 1505 may include a memory unit 1504 to couple to processor circuit 1502. Memory unit 1504 may be coupled to processor circuit 1502 via communications bus 1543, or by a dedicated communications bus between processor circuit 1502 and memory unit 1504, as desired for a given implementation. Memory unit 04 may be implemented using any machine-readable or computer-readable media capable of storing data, including both volatile and non-volatile memory. In some embodiments, the machine-readable or computer-readable medium may include a non-transitory medium. The embodiments are not limited in this context.

Computing device 1505 may include a graphics processing unit (GPU) 1506, in various embodiments. The GPU 1506 may include any processing unit, logic or circuitry optimized to perform graphics-related operations as well as the video decoder engines and the frame correlation engines. The GPU 1506 may be used to render 2-dimensional (2-D) and/or 3-dimensional (3-D) images for various applications such as video games, graphics, computer-aided design (CAD), simulation and visualization tools, imaging, etc. Various embodiments are not limited in this manner; GPU 1506 may process any type of graphics data such as pictures, videos, programs, animation, 3D, 2D, objects images and so forth.

In some embodiments, computing device 1505 may include a display controller 1508. Display controller 1508 may be any type of processor, controller, circuit, logic, and so forth for processing graphics information and displaying the graphics information. The display controller 1508 may receive or retrieve graphics information from one or more buffers, such as buffer(s) 220. After processing the information, the display controller 1508 may send the graphics information to a display.

In various embodiments, system 1500 may include a transceiver 1544. Transceiver 1544 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, transceiver 1544 may operate in accordance with one or more applicable standards in any version. The embodiments are not limited in this context.

In various embodiments, computing device 1505 may include a display 1545. Display 1545 may constitute any display device capable of displaying information received from processor circuit 1502, graphics processing unit 1506 and display controller 1508.

In various embodiments, computing device 1505 may include storage 1546. Storage 1546 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 1546 may include technology to increase the storage performance enhanced protection for valuable digital media when multiple hard drives are included, for example. Further examples of storage 1546 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, computing device 1505 may include one or more I/O adapters 1547. Examples of I/O adapters 1547 may include Universal Serial Bus (USB) ports/adapters, IEEE 1394 Firewire ports/adapters, and so forth. The embodiments are not limited in this context.

Figure 16:
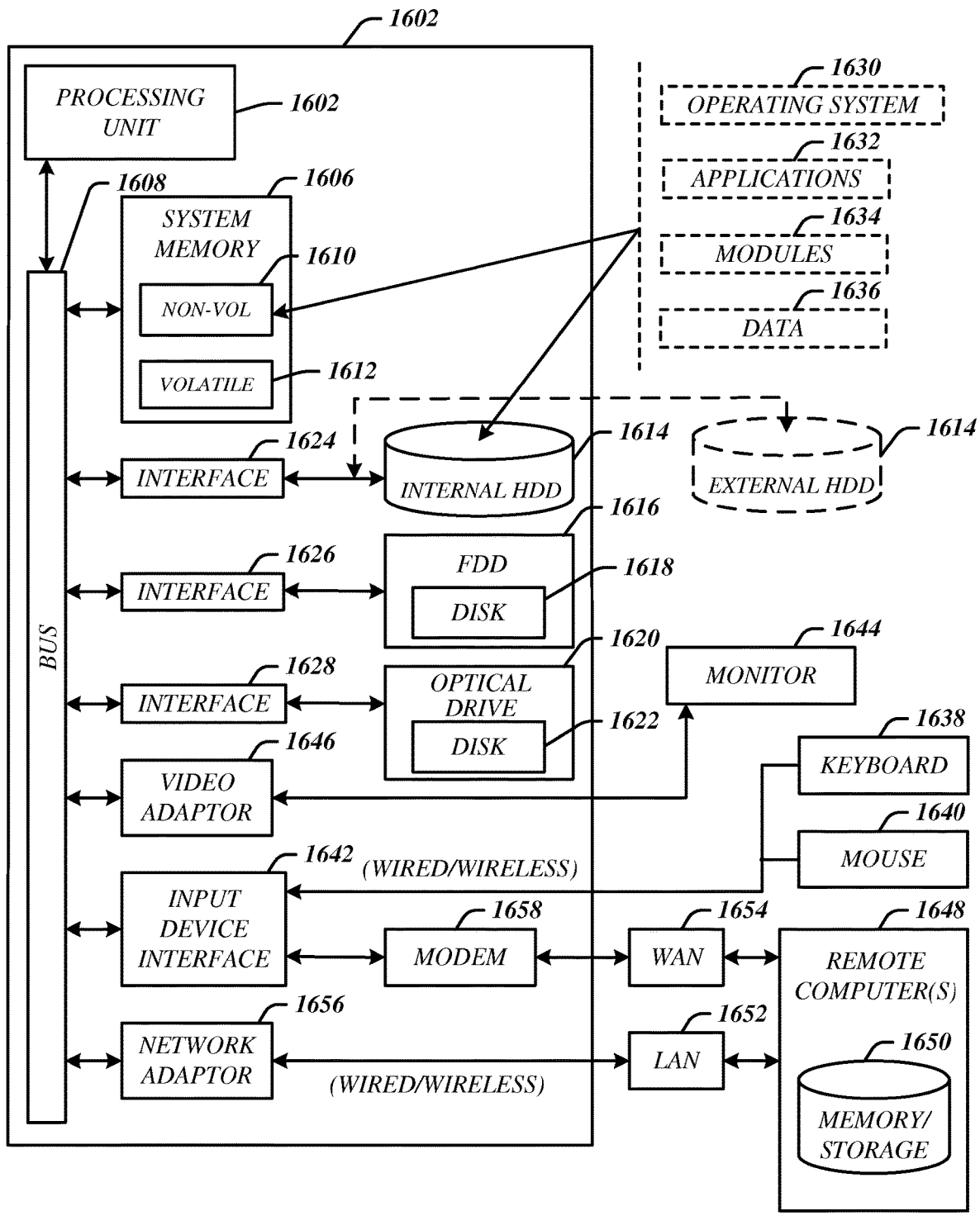
FIG. 16 illustrates an exemplary embodiment of a computing architecture.

FIG. 16 illustrates an embodiment of an exemplary computing architecture 1600 suitable for implementing various embodiments as previously described. In one embodiment, the computing architecture 1600 may include or be implemented as part of systems 100.

As used in this application, the terms "system" and "component" are intended to refer to a computer-related entity, either hardware, a combination of hardware and software, software, or software in execution, examples of which are provided by the exemplary computing architecture 1600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1600.

As shown in FIG. 16, the computing architecture 1600 includes a processing unit 1604, a system memory 1606 and a system bus 1608. The processing unit 1604 can be any of various commercially available processors.

The system bus 1608 provides an interface for system components including, but not limited to, the system memory 1606 to the processing unit 1604. The system bus 1608 can be any of several types of bus structure that may further interconnect to a memory bus (with or without a memory controller), a peripheral bus, and a local bus using any of a variety of commercially available bus architectures. Interface adapters may connect to the system bus 1608 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1600 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 16, the system memory 1606 can include non-volatile memory 1610 and/or volatile memory 1612. A basic input/output system (BIOS) can be stored in the non-volatile memory 1610.

The computer 1602 may include various types of computer-readable storage media in the form of one or more lower speed memory units, including an internal (or external) hard disk drive (HDD) 1614, a magnetic floppy disk drive (FDD) 1616 to read from or write to a removable magnetic disk 1618, and an optical disk drive 1620 to read from or write to a removable optical disk 1622 (e.g., a CD-ROM or DVD). The HDD 1614, FDD 1616 and optical disk drive 1620 can be connected to the system bus 1608 by a HDD interface 1624, an FDD interface 1626 and an optical drive interface 1628, respectively. The HDD interface 1624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1610, 1612, including an operating system 1630, one or more application programs 1632, other program modules 1634, and program data 1636. In one embodiment, the one or more application programs 1632, other program modules 1634, and program data 1636 can include, for example, the various applications and/or components of the system 700.

A user can enter commands and information into the computer 1602 through one or more wire/wireless input devices, for example, a keyboard 1638 and a pointing device, such as a mouse 1640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 1604 through an input device interface 1642 that is coupled to the system bus 1608, but can be connected by other interfaces such as a parallel port, IEEE 1394 serial port, a game port, a USB port, an IR interface, and so forth.

A monitor 1644 or other type of display device is also connected to the system bus 1608 via an interface, such as a video adaptor 1646. The monitor 1644 may be internal or external to the computer 1602. In addition to the monitor 1644, a computer typically includes other peripheral output devices, such as speakers, printers, and so forth.

The computer 1602 may operate in a networked environment using logical connections via wire and/or wireless communications to one or more remote computers, such as a remote computer 1648. The remote computer 1648 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1650 is illustrated. The logical connections depicted include wire/ wireless connectivity to a local area network (LAN) 1652 and/or larger networks, for example, a wide area network (WAN) 1654. Such LAN and WAN networking environments are commonplace in offices and companies, and facilitate enterprise-wide computer networks, such as intranets, all of which may connect to a global communications network, for example, the Internet.

When used in a LAN networking environment, the computer 1602 is connected to the LAN 1652 through a wire and/or wireless communication network interface or adaptor 1656. The adaptor 1656 can facilitate wire and/or wireless communications to the LAN 1652, which may also include a wireless access point disposed thereon for communicating with the wireless functionality of the adaptor 1656.

When used in a WAN networking environment, the computer 1602 can include a modem 1658, or is connected to a communications server on the WAN 1654, or has other means for establishing communications over the WAN 1654, such as by way of the Internet. The modem 1658, which can be internal or external and a wire and/or wireless device, connects to the system bus 1608 via the input device interface 1642. In a networked environment, program modules depicted relative to the computer 1602, or portions thereof, can be stored in the remote memory/storage device 1650. It will be appreciated that the network connections shown are exemplary and other means of establishing a communications link between the computers can be used.

The computer 1602 is operable to communicate with wire and wireless devices or entities using the IEEE 1602 family of standards, such as wireless devices operatively disposed in wireless communication (e.g., IEEE 1602.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 1602.11x (a, b, g, n, etc.) to provide secure, reliable, fast wireless connectivity. A Wi-Fi network can be used to connect computers to each other, to the Internet, and to wire networks (which use IEEE 1602.3-related media and functions).

The various elements of the systems 100, 1500, 1600 as previously described with reference to FIGS. 1-16 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through thirty-two (1-32) provided below are intended to be exemplary and non-limiting.

In a first example, a system or an apparatus having processing circuitry and a memory coupled with the processing circuitry, the memory to store at least one master forward transform matrix comprising signed constants having a defined number of precision bits and a sign bit. Further, the processing circuitry to perform the transformation on residuals of pixel values of a frame using one of the at least one master forward transform matrix or a forward transform matrix derived from one of the at least master forward transform matrix, and determine which forward transform matrix to use to perform the transformation based on at least a transform unit size.

In a second example and in furtherance of the first example, the system or apparatus may include the at least one master forward transform matrix comprising a 32×32 discrete cosine transform (DCT) forward transform matrix and a 4×4 asymmetric discrete sine transform (ADST) forward transform matrix.

In a third example and in furtherance of any of the previous examples, the system or apparatus may include the at least one master forward transform matrix comprising a 32×32 discrete cosine transform (DCT) forward transform matrix further comprising 32 columns and 32 rows of signed constants, and the processing circuitry to derive a 16×16 DCT forward transform matrix to perform the transformation by extracting the signed constants from every other row and the first 16 columns of the 32×32 DCT forward transform matrix starting with a first row and a first column.

In a fourth example and in furtherance of any of the previous examples, the system or apparatus may include the processing circuitry to derive an 8×8 DCT forward transform matrix to perform the transformation by extracting the signed constants from every other row and the first eight columns of the 16×16 DCT forward transform matrix starting with the first row and the first column.

In a fifth example and in furtherance of any of the previous examples, the system or apparatus may include the at least one master forward transform matrix comprising a 32×32 discrete cosine transform (DCT) forward transform matrix further comprising 32 columns and 32 rows of signed constants, and the processing circuitry to derive an 8×8 DCT forward transform matrix to perform the transformation by extracting the signed constants from every fourth row and the first eight columns of the 32×32 DCT forward transform matrix starting with a first row and a first column.

In a sixth example and in furtherance of any of the previous examples, the system or apparatus may include the processing circuitry to derive a 4×4 DCT forward transform matrix to perform the transformation by extracting the signed constants from every other row and the first four columns of an 8×8 DCT forward transform matrix starting with the first row and the first column.

In a seventh example and in furtherance of any of the previous examples, the system or apparatus may include the at least one master forward transform matrix comprising a 32×32 discrete cosine transform (DCT) forward transform matrix further comprising 32 columns and 32 rows of signed constants, and the processing circuitry to derive a 4×4 DCT forward transform matrix to perform the transformation by extracting the signed constants from every eighth row and the first four columns of the 32×32 DCT forward transform matrix starting with a first row and a first column.

In an eighth example and in furtherance of any of the previous examples, the system or apparatus may include the at least one master forward transform matrix comprising a 32×32 discrete cosine transform (DCT) forward transform matrix further comprising 32 columns and 32 rows of signed constants, and the processing circuitry to derive a 16×16 asymmetric discrete sine transform (ADST) forward transform matrix to perform the transformation by extracting the signed constants from every other row in reverse order and the first 16 columns of the 32×32 DCT forward transform matrix starting with a last row and a first column, wherein every other column is negated starting with a second column.

In a ninth example and in furtherance of any of the previous examples, the system or apparatus may include the at least one master forward transform matrix comprising a 32×32 DCT forward transform matrix further comprising 32 columns and 32 rows of signed constants, and the processing circuitry to derive an 8×8 asymmetric discrete sine transform (ADST) forward transform matrix to perform the transformation by extracting the signed constants from every fourth row in reverse order and the first eight columns of the 32×32 DCT forward transform matrix starting with a second to last row and a first column, wherein every other column is negated starting with a second column.

In a tenth example and in furtherance of any of the previous examples, the system or apparatus may include a read-only memory.

In an eleventh example and in furtherance of any of the previous examples, the system or apparatus may include the processing circuitry to perform the transformation based on a VP9 video compression standard.

In an eleventh example and in furtherance of any of the previous examples, a computer-implemented method may include storing, in memory, at least one master forward transform matrix comprising signed constants having a defined number of precision bits and a sign bit, determining, by processing circuitry, which forward transform matrix to use to perform a transformation based on at least a transform unit size and performing, by the processing circuitry, the transformation on residuals of pixel values of a frame using one of the at least one master forward transform matrix or a forward transform matrix derived from one of the master forward transform matrix at least partially based on the determination.

In a twelfth example and in furtherance of any of the previous examples, a computer-implemented method may include storing, in memory, at least one master forward transform matrix comprising signed constants having a defined number of precision bits and a sign bit, determining, by processing circuitry, which forward transform matrix to use to perform a transformation based on at least a transform unit size and performing, by the processing circuitry, the transformation on residuals of pixel values of a frame using one of the at least one master forward transform matrix or a forward transform matrix derived from one of the master forward transform matrix at least partially based on the determination.

In a thirteenth example and in furtherance of any of the previous examples, a computer-implemented method may include the at least one master forward transform matrix comprising a 32×32 discrete cosine transform (DCT) forward transform matrix and a 4×4 asymmetric discrete sine transform (ADST) forward transform matrix.

In a fourteenth example and in furtherance of any of the previous examples, a computer-implemented method may include the at least one master forward transform matrix comprising a 32×32 discrete cosine transform (DCT) forward transform matrix further comprising 32 columns and 32 rows of signed constants and deriving a 16×16 DCT forward transform matrix to perform the transformation by extracting the signed constants from every other row and the first 16 columns of the 32×32 DCT forward transform matrix starting with a first row and a first column.

In a fifteenth example and in furtherance of any of the previous examples, a computer-implemented method may include the at least one master forward transform matrix comprising a 32×32 discrete cosine transform (DCT) forward transform matrix further comprising 32 columns and 32 rows of signed constants and deriving an 8×8 DCT forward transform matrix to perform the transformation by extracting the signed constants from every fourth row and the first eight columns of the 32×32 DCT forward transform matrix starting with a first row and a first column.

In a sixteenth example and in furtherance of any of the previous examples, a computer-implemented method may include the at least one master forward transform matrix comprising a 32×32 DCT forward transform matrix further comprising 32 columns and 32 rows of signed constants and deriving a 4×4 DCT forward transform matrix to perform the transformation by extracting the signed constants from every eighth row and the first four columns of the 32×32 DCT forward transform matrix starting with a first row and a first column.

In a seventeenth example and in furtherance of any of the previous examples, a computer-implemented method may include the at least one master forward transform matrix comprising a 32×32 discrete cosine transform (DCT) forward transform matrix further comprising 32 columns and 32 rows of signed constants, and deriving a 16×16 asymmetric discrete sine transform (ADST) forward transform matrix to perform the transformation by extracting the signed constants from every other row in reverse order and the first 16 columns of the 32×32 DCT forward transform matrix starting with a last row and a first column, wherein every other column is negated starting with a second column.

In an eighteenth example and in furtherance of any of the previous examples, a computer-implemented method may include the at least one master forward transform matrix comprising a 32×32 discrete cosine transform (DCT) forward transform matrix further comprising 32 columns and 32 rows of signed constants and deriving an 8×8 asymmetric discrete sine transform (ADST) forward transform matrix to perform the transformation by extracting the signed constants from every fourth row in reverse order and the first eight columns of the 32×32 DCT forward transform matrix starting with a second to last row and a first column, wherein every other column is negated starting with a second column.

In an nineteenth example and in furtherance of any of the previous examples, an article comprising a computer-readable storage medium comprising a plurality of instructions that when executed enable a system to store, in memory, at least one master forward transform matrix comprising signed constants having a defined number of precision bits and a sign bit, determine, by processing circuitry, which forward transform matrix to use to perform a transformation based on at least a transform unit size and perform, by processing circuitry, the transformation on residuals of pixel values of a frame using one of the at least one master forward transform matrices or a forward transform matrix derived from one of the master forward transform matrix at least partially based on the determination.

In an twentieth example and in furtherance of any of the previous examples, an article comprising a computer-readable storage medium comprising a plurality of instructions that when executed enable a system to store, in memory, at least one master forward transform matrix comprising signed constants having a defined number of precision bits and a sign bit, determine, by processing circuitry, which forward transform matrix to use to perform a transformation based on at least a transform unit size and perform, by processing circuitry, the transformation on residuals of pixel values of a frame using one of the at least one master forward transform matrices or a forward transform matrix derived from one of the master forward transform matrix at least partially based on the determination, the at least one master forward transform matrix comprising a 32×32 discrete cosine transformation (DCT) forward transform matrix and a 4×4 asymmetric discrete sine transformation (ADST) forward transform matrix.

In an twenty-first example and in furtherance of any of the previous examples, an article comprising a computer-readable storage medium may include at least one master forward transform matrix comprising a 32×32 discrete cosine transform (DCT) forward transform matrix further comprising 32 columns and 32 rows of signed constants, and the storage medium comprising instructions that when executed enable the system to derive a 16×16 DCT forward transform matrix to perform the transformation by extracting the signed constants from every other row and the first 16 columns of the 32×32 DCT forward transform matrix starting with a first row and a first column.

In an twenty-second example and in furtherance of any of the previous examples, an article comprising a computer-readable storage medium may include at least one master forward transform matrix comprising a 32×32 discrete cosine transform (DCT) forward transform matrix further comprising 32 columns and 32 rows of signed constants, and the storage medium comprising instructions that when executed enable the system to derive an 8×8 DCT forward transform matrix to perform the transformation by extracting the signed constants from every fourth row and the first eight columns of the 32×32 DCT forward transform matrix starting with a first row and a first column.

In an twenty-third example and in furtherance of any of the previous examples, an article comprising a computer-readable storage medium may include at least one master forward transform matrix comprising a 32×32 discrete cosine transform (DCT) forward transform matrix further comprising 32 columns and 32 rows of signed constants, and the storage medium comprising instructions that when executed enable the system to derive a 4×4 DCT forward transform matrix to perform the transformation by extracting the signed constants from every eighth row and the first four columns of the 32×32 DCT forward transform matrix starting with a first row and a first column.

In an twenty-fourth example and in furtherance of any of the previous examples, an article comprising a computer-readable storage medium may include at least one master forward transform matrix comprising a 32×32 discrete cosine transform (DCT) forward transform matrix further comprising 32 columns and 32 rows of signed constants, and the storage medium comprising instructions that when executed enable the system to derive a 16×16 asymmetric discrete sine transform (ADST) forward transform matrix to perform the transformation by extracting the signed constants from every other row in reverse order and the first 16 columns of the 32×32 DCT forward transform matrix starting with a last row and a first column, wherein every other column is negated starting with a second column.

In an twenty-fifth example and in furtherance of any of the previous examples, an article comprising a computer-readable storage medium may include at least one master forward transform matrix comprising a 32×32 discrete cosine transform (DCT) forward transform matrix further comprising 32 columns and 32 rows of signed constants, and the storage medium comprising instructions that when executed enable the system to derive an 8×8 asymmetric discrete sine transform (ADST) forward transform matrix to perform the transformation by extracting the signed constants from every fourth row in reverse order and the first eight columns of the 32×32 DCT forward transform matrix starting with a second to last row and a first column, wherein every other column is negated starting with a second column.

In an twenty-sixth example and in furtherance of any of the previous examples, an apparatus may include means for storing at least one master forward transform matrix comprising signed constants having a defined number of precision bits and a sign bit, means for determining which forward transform matrix to use to perform a transformation based on at least a transform unit size, and means for performing the transformation on residuals of pixel values of a frame using one of the at least one master forward transform matrix or a forward transform matrix derived from one of the master forward transform matrix at least partially based on the determination.

In a twenty-seventh example and in furtherance of any of the previous examples, an apparatus may include the at least one master forward transform matrix comprising a 32×32 discrete cosine transform (DCT) forward transform matrix and a 4×4 asymmetric discrete sine transform (ADST) forward transform matrix.

In a twenty-eighth example and in furtherance of any of the previous examples, an apparatus may include the at least one master forward transform matrix comprising a 32×32 discrete cosine transform (DCT) forward transform matrix further comprising 32 columns and 32 rows of signed constants and means for deriving a 16×16 DCT forward transform matrix to perform the transformation by extracting the signed constants from every other row and the first 16 columns of the 32×32 DCT forward transform matrix starting with a first row and a first column.

In a twenty-ninth example and in furtherance of any of the previous examples, an apparatus may include the at least one master forward transform matrix comprising a 32×32 discrete cosine transform (DCT) forward transform matrix further comprising 32 columns and 32 rows of signed constants and means for deriving an 8×8 DCT forward transform matrix to perform the transformation by extracting the signed constants from every fourth row and the first eight columns of the 32×32 DCT forward transform matrix starting with a first row and a first column.

In a thirtieth example and in furtherance of any of the previous examples, an apparatus may include the at least one master forward transform matrix comprising a 32×32 DCT forward transform matrix further comprising 32 columns and 32 rows of signed constants and means for deriving a 4×4 DCT forward transform matrix to perform the transformation by extracting the signed constants from every eighth row and the first four columns of the 32×32 DCT forward transform matrix starting with a first row and a first column.

In a thirty-first example and in furtherance of any of the previous examples, an apparatus may include, the at least one master forward transform matrix comprising a 32×32 discrete cosine transform (DCT) forward transform matrix further comprising 32 columns and 32 rows of signed constants and means for deriving a 16×16 asymmetric discrete sine transform (ADST) forward transform matrix to perform the transformation by extracting the signed constants from every other row in reverse order and the first 16 columns of the 32×32 DCT forward transform matrix starting with a last row and a first column, wherein every other column is negated starting with a second column.

In a thirty-second example and in furtherance of any of the previous examples, an apparatus may include, the at least one master forward transform matrix comprising a 32×32 discrete cosine transform (DCT) forward transform matrix further comprising 32 columns and 32 rows of signed constants and means for deriving an 8×8 asymmetric discrete sine transform (ADST) forward transform matrix to perform the transformation by extracting the signed constants from every fourth row in reverse order and the first eight columns of the 32×32 DCT forward transform matrix starting with a second to last row and a first column, wherein every other column is negated starting with a second column.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   processing circuitry;
   a memory coupled with the processing circuitry, the memory to store at least one master forward transform matrix comprising signed constants having a defined number of precision bits and a sign bit, and
   the processing circuitry to perform the transformation on residuals of pixel values of a frame using one of the at least one master forward transform matrix or a forward transform matrix derived from one of the at least master forward transform matrix, and determine which forward transform matrix to use to perform the transformation based on at least a transform unit size, the processing circuitry to defer a rounding operation until a final forward transform matrix is generated.

2. The apparatus of claim 1, the at least one master forward transform matrix comprising a 32×32 discrete cosine transform (DCT) forward transform matrix and a 4×4 asymmetric discrete sine transform (ADST) forward transform matrix.

3. The apparatus of claim 1, the at least one master forward transform matrix comprising a 32×32 discrete cosine transform (DCT) forward transform matrix further comprising 32 columns and 32 rows of signed constants, and
   the processing circuitry to derive a 16×16 DCT forward transform matrix to perform the transformation by extracting the signed constants from every other row and the first 16 columns of the 32×32 DCT forward transform matrix starting with a first row and a first column.

4. The apparatus of claim 3, the processing circuitry to derive an 8×8 DCT forward transform matrix to perform the transformation by extracting the signed constants from every other row and the first eight columns of the 16×16 DCT forward transform matrix starting with the first row and the first column.

5. The apparatus of claim 1, the at least one master forward transform matrix comprising a 32×32 discrete cosine transform (DCT) forward transform matrix further comprising 32 columns and 32 rows of signed constants, and
   the processing circuitry to derive an 8×8 DCT forward transform matrix to perform the transformation by extracting the signed constants from every fourth row and the first eight columns of the 32×32 DCT forward transform matrix starting with a first row and a first column.

6. The apparatus of claim 5, the processing circuitry to derive a 4×4 DCT forward transform matrix to perform the transformation by extracting the signed constants from every other row and the first four columns of the 8×8 DCT forward transform matrix starting with the first row and the first column.

7. The apparatus of claim 1, the at least one master forward transform matrix comprising a 32×32 discrete cosine transform (DCT) forward transform matrix further comprising 32 columns and 32 rows of signed constants, and
   the processing circuitry to derive a 4×4 DCT forward transform matrix to perform the transformation by extracting the signed constants from every eighth row and the first four columns of the 32×32 DCT forward transform matrix starting with a first row and a first column.

8. The apparatus of claim 1, the at least one master forward transform matrix comprising a 32×32 discrete cosine transform (DCT) forward transform matrix further comprising 32 columns and 32 rows of signed constants, and the processing circuitry to derive a 16×16 asymmetric discrete sine transform (ADST) forward transform matrix to perform the transformation by extracting the signed constants from every other row in reverse order and the first 16 columns of the 32×32 DCT forward transform matrix starting with a last row and a first column, wherein every other column is negated starting with a second column.

9. The apparatus of claim 1, the at least one master forward transform matrix comprising a 32×32 DCT forward transform matrix further comprising 32 columns and 32 rows of signed constants, and the processing circuitry to derive an 8×8 asymmetric discrete sine transform (ADST) forward transform matrix to perform the transformation by extracting the signed constants from every fourth row in reverse order and the first eight columns of the 32×32 DCT forward transform matrix starting with a second to last row and a first column, wherein every other column is negated starting with a second column.

10. The apparatus of claim 1, the memory comprising a read-only memory.

11. The apparatus of claim 1, the processing circuitry to perform the transformation based on a VP9 video compression standard.

12. A computer-implemented method, comprising:

storing, in memory, at least one master forward transform matrix comprising signed constants having a defined number of precision bits and a sign bit;

determining, by processing circuitry, which forward transform matrix to use to perform a transformation based on at least a transform unit size;

performing, by the processing circuitry, the transformation on residuals of pixel values of a frame using one of the at least one master forward transform matrix or a forward transform matrix derived from one of the master forward transform matrix at least partially based on the determination; and deferring, by the processing circuitry, a rounding operation until a final forward transform matrix is generated.

13. The computer-implemented method of claim 12, the at least one master forward transform matrix comprising a 32×32 discrete cosine transform (DCT) forward transform matrix and a 4×4 asymmetric discrete sine transform (ADST) forward transform matrix.

14. The computer-implemented method of claim 12, the at least one master forward transform matrix comprising a 32×32 discrete cosine transform (DCT) forward transform matrix further comprising 32 columns and 32 rows of signed constants; and deriving a 16×16 DCT forward transform matrix to perform the transformation by extracting the signed constants from every other row and the first 16 columns of the 32×32 DCT forward transform matrix starting with a first row and a first column.

15. The computer-implemented method of claim 12, the at least one master forward transform matrix comprising a 32×32 discrete cosine transform (DCT) forward transform matrix further comprising 32 columns and 32 rows of signed constants; and deriving an 8×8 DCT forward transform matrix to perform the transformation by extracting the signed constants from every fourth row and the first eight columns of the 32×32 DCT forward transform matrix starting with a first row and a first column.

16. The computer-implemented method of claim 12, the at least one master forward transform matrix comprising a 32×32 DCT forward transform matrix further comprising 32 columns and 32 rows of signed constants, and deriving a 4×4 DCT forward transform matrix to perform the transformation by extracting the signed constants from every eighth row and the first four columns of the 32×32 DCT forward transform matrix starting with a first row and a first column.

17. The computer-implemented method of claim 12, the at least one master forward transform matrix comprising a 32×32 discrete cosine transform (DCT) forward transform matrix further comprising 32 columns and 32 rows of signed constants, and deriving a 16×16 asymmetric discrete sine transform (ADST) forward transform matrix to perform the transformation by extracting the signed constants from every other row in reverse order and the first 16 columns of the 32×32 DCT forward transform matrix starting with a last row and a first column, wherein every other column is negated starting with a second column.

18. The computer-implemented method of claim 12, the at least one master forward transform matrix comprising a 32×32 discrete cosine transform (DCT) forward transform matrix further comprising 32 columns and 32 rows of signed constants, and deriving an 8×8 asymmetric discrete sine transform (ADST) forward transform matrix to perform the transformation by extracting the signed constants from every fourth row in reverse order and the first eight columns of the 32×32 DCT forward transform matrix starting with a second to last row and a first column, wherein every other column is negated starting with a second column.

19. An article comprising a computer-readable storage medium comprising a plurality of instructions that when executed enable a system to:

store, in memory, at least one master forward transform matrix comprising signed constants having a defined number of precision bits and a sign bit;

determine, by processing circuitry, which forward transform matrix to use to perform a transformation based on at least a transform unit size;

perform, by processing circuitry, the transformation on residuals of pixel values of a frame using one of the at least one master forward transform matrices or a forward transform matrix derived from one of the master forward transform matrix at least partially based on the determination; and defer, by processing circuitry, a rounding operation until a final forward transform matrix is generated.

20. The storage medium of claim 19, the at least one master forward transform matrix comprising a 32×32 discrete cosine transformation (DCT) forward transform matrix and a 4×4 asymmetric discrete sine transformation (ADST) forward transform matrix.

21. The storage medium of claim 19, the at least one master forward transform matrix comprising a 32×32 discrete cosine transform (DCT) forward transform matrix further comprising 32 columns and 32 rows of signed constants, and the storage medium comprising instructions that when executed enable the system to derive a 16×16 DCT forward transform matrix to perform the transformation by extracting the signed constants from every other row and the first 16 columns of the 32×32 DCT forward transform matrix starting with a first row and a first column.

22. The storage medium of claim 19, the at least one master forward transform matrix comprising a 32×32 discrete cosine transform (DCT) forward transform matrix further comprising 32 columns and 32 rows of signed constants, and the storage medium comprising instructions that when executed enable the system to derive an 8×8 DCT forward transform matrix to perform the transformation by extracting the signed constants from every fourth row and the first eight columns of the 32×32 DCT forward transform matrix starting with a first row and a first column.

23. The storage medium of claim 19, the at least one master forward transform matrix comprising a 32×32 discrete cosine transform (DCT) forward transform matrix further comprising 32 columns and 32 rows of signed constants, and the storage medium comprising instructions that when executed enable the system to derive a 4×4 DCT forward transform matrix to perform the transformation by extracting the signed constants from every eighth row and the first four columns of the 32×32 DCT forward transform matrix starting with a first row and a first column.

24. The storage medium of claim 19, the at least one master forward transform matrix comprising a 32×32 discrete cosine transform (DCT) forward transform matrix further comprising 32 columns and 32 rows of signed constants, and the storage medium comprising instructions that when executed enable the system to derive a 16×16 asymmetric discrete sine transform (ADST) forward transform matrix to perform the transformation by extracting the signed constants from every other row in reverse order and the first 16 columns of the 32×32 DCT forward transform matrix starting with a last row and a first column, wherein every other column is negated starting with a second column.

25. The storage medium of claim 19, the at least one master forward transform matrix comprising a 32×32 discrete cosine transform (DCT) forward transform matrix further comprising 32 columns and 32 rows of signed constants, and the storage medium comprising instructions that when executed enable the system to derive an 8×8 asymmetric discrete sine transform (ADST) forward transform matrix to perform the transformation by extracting the signed constants from every fourth row in reverse order and the first eight columns of the 32×32 DCT forward transform matrix starting with a second to last row and a first column, wherein every other column is negated starting with a second column.

\* \* \* \* \*